United States Patent [19]

Clough, Jr. et al.

[11] 4,029,581

[45] June 14, 1977

[54] AERATING SYSTEM

[75] Inventors: Roy L. Clough, Jr., Concord, N.H.; John F. Snow, Warwick, R.I.

[73] Assignee: Xodar Corporation, Warwick, R.I.

[22] Filed: Dec. 26, 1974

[21] Appl. No.: 536,595

[52] U.S. Cl. .............................. 210/220; 261/124
[51] Int. Cl.² ........................................... B01F 3/04
[58] Field of Search ........ 210/15, 142, 220, 221 R; 261/122, 124

[56] References Cited

UNITED STATES PATENTS

| | | | |
|---|---|---|---|
| 1,547,548 | 7/1925 | Allen, Jr. et al. | 261/122 X |
| 1,792,286 | 2/1931 | Curry et al. | 261/122 |
| 1,849,146 | 3/1932 | Kraut | 261/122 |
| 2,718,275 | 9/1955 | Banks | 261/122 X |
| 2,947,525 | 8/1960 | Klein | 261/122 |
| 3,063,689 | 11/1962 | Coppock | 261/122 X |
| 3,432,154 | 3/1969 | Danjes | 261/122 |
| 3,547,812 | 12/1970 | McWhirter | 210/15 X |
| 3,642,260 | 2/1972 | Danjes et al. | 261/122 |
| 3,664,647 | 5/1972 | Snow et al. | 261/122 X |
| 3,841,997 | 10/1974 | McGee | 261/122 X |

Primary Examiner—Charles N. Hart
Assistant Examiner—Robert H. Spitzer
Attorney, Agent, or Firm—Schiller & Pandiscio

[57] ABSTRACT

Apparatus for agitating and aerating sewage and industrial waste comprising a plurality of flexible, inflatable cells disposed in the bottom of a liquid waste holder and means for supplying and withdrawing air to and from the cells so as to cause them to periodically inflate and deflate, whereby the liquid is agitated by the varying water displacement of the cells. Aeration is accomplished by providing the cells with gas-escape orifices that permit air to escape from the cells into the surrounding liquid at controlled rates in the form of small bubbles that rise in the liquid and make intimate contact with suspended solids.

7 Claims, 8 Drawing Figures

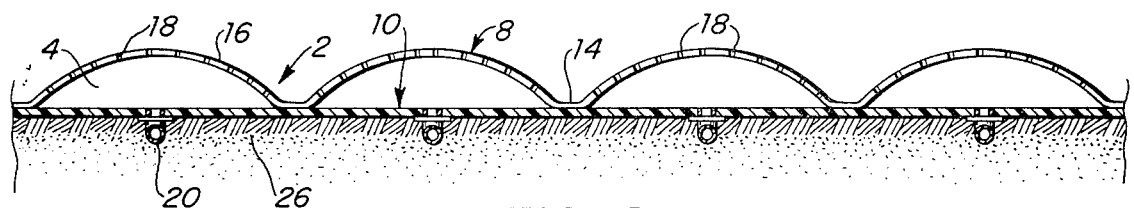
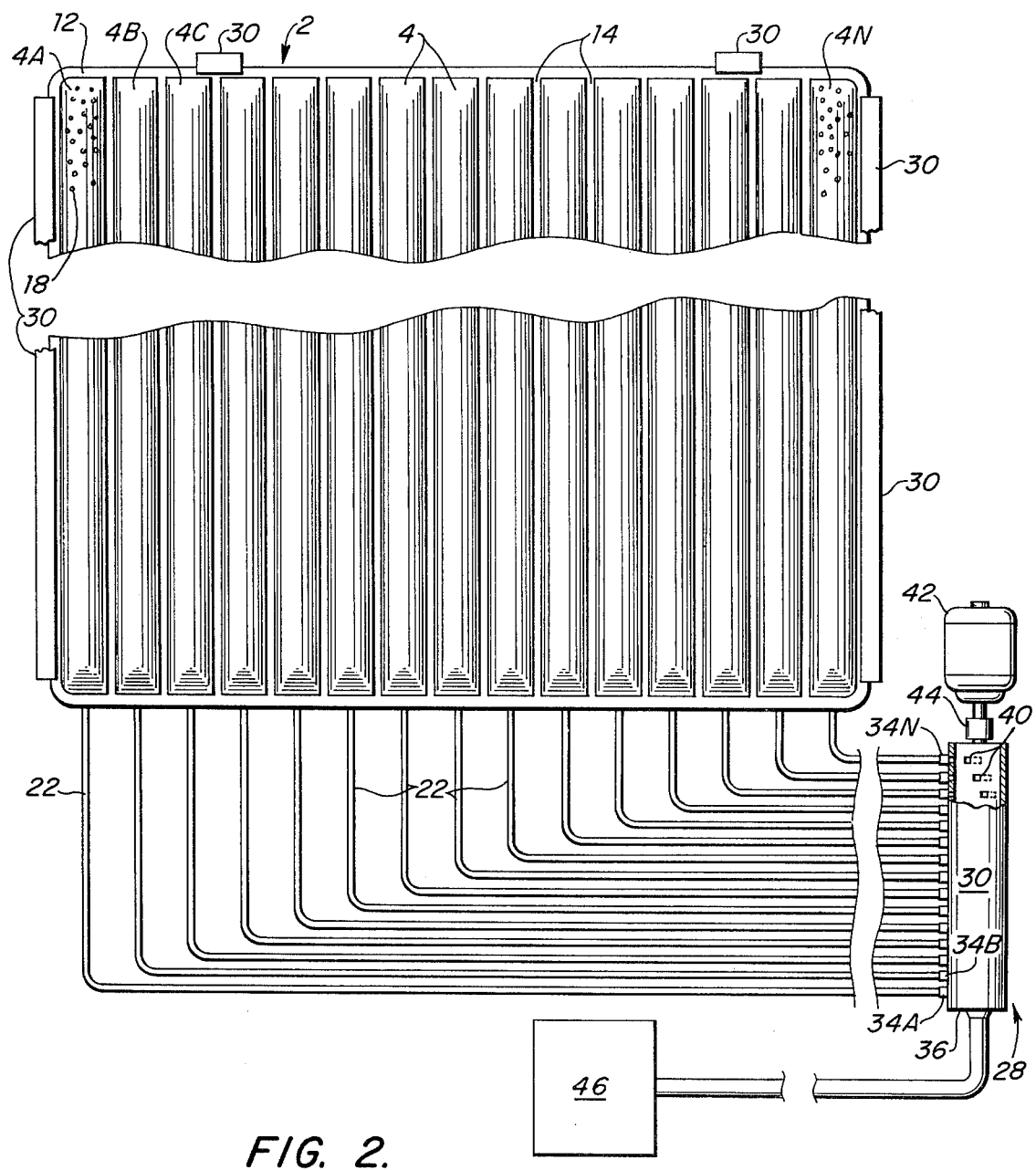
FIG. 1.
FIG. 2.

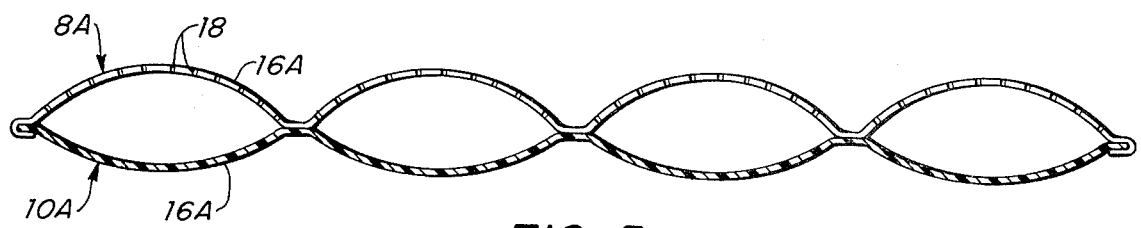
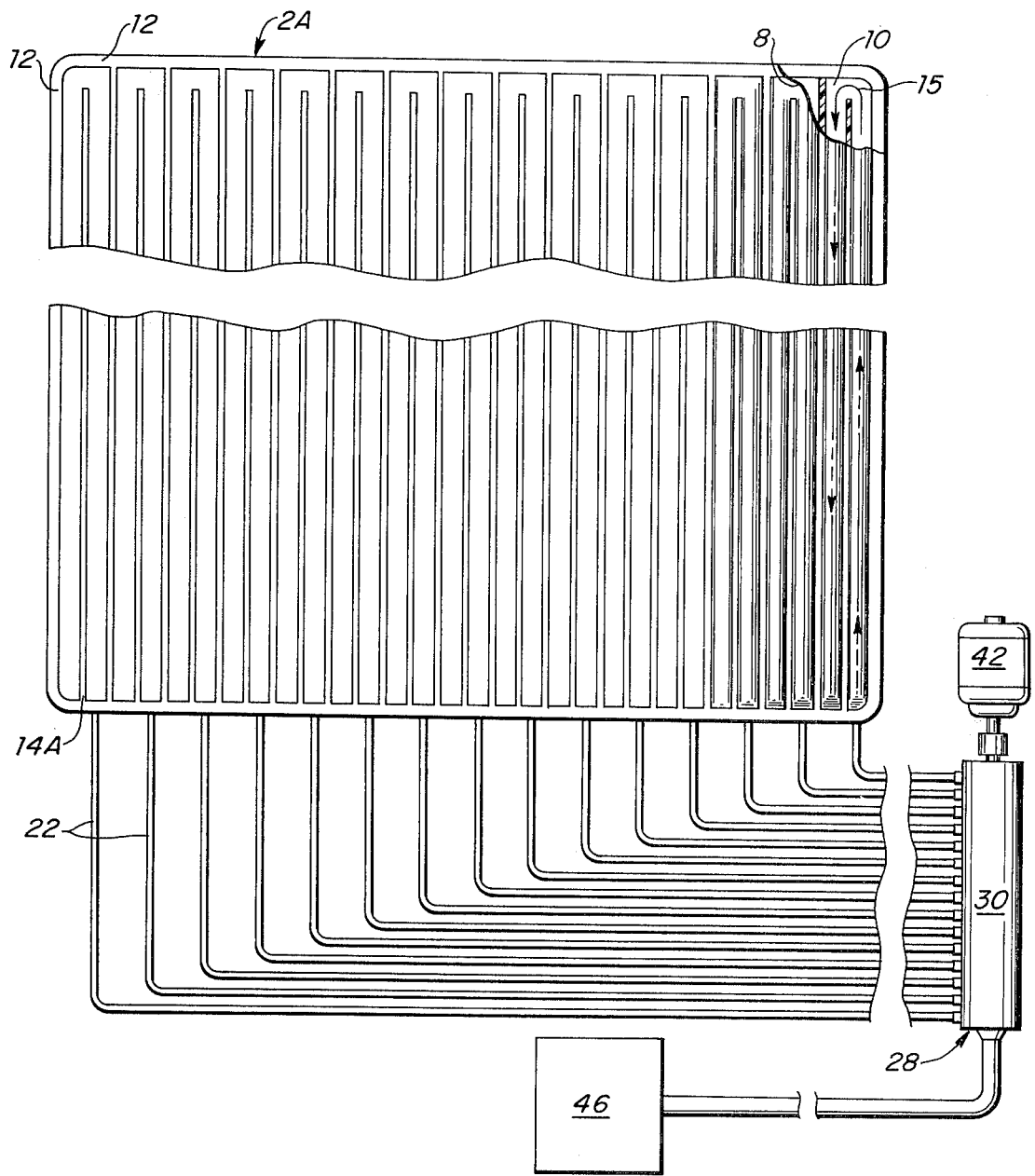

AERATING SYSTEM

This invention relates to the treatment of sewage, industrial wastes, stagnant ponds, pool and the like, and more particularly to agitation and aeration of polluted bodies of water to enhance treatment through the medium of bacterial and chemical action.

In a growing number of localities governmental regulations require that the Biological Oxygen Demand or B.O.D. (i.e. the amount of oxygen required to oxidize a given amount of waste discharge) of liquid effluents being discharged into a river or the sea not exceed predetermined limits. Accordingly the usual practice in modern waste treatment plants is to direct the liquid effluent into a holding lagoon, tank, pool, moat or the like where it is exposed to oxygen for a period sufficient to effect the necessary oxidation of suspended organic matter. Once aeration has been completed, the effluent usually is filtered to remove remaining solids, chlorinated, and then discharged into a river or the sea. The duration of the aeration cycle varies according to the mode of aeration and the character of the effluent, but typically ranges about 50 – 60 days in open lagoons and 25 – 30 days in tanks equipped with agitation devices.

The typical waste treatment plant embodies aerating equipment which directs air into the holding lagoon or tank at a number of points in finely divided form so that it will pass upwards through the liquid and intimately contact and thereby oxidize suspended organic matter. Various types of systems for effecting aeration as above described have been devised and put into use as exemplified by U.S. Pat. Nos. 3,396,950, 3,063,689, 3,470,091, 3,347,537, 3,182,978, 2,815,943, 2,947,525, 31,133,130 and 3,490,752. However, aerating means heretofore available have not been fully satisfactory because of high installation and maintenance costs, low efficiency resulting in high input air requriements and long aeration cycles. Furthermore, although aeration is most efficient when accompanied by sludge agitation, prior aeration devices have little or no capability for agitating sludge. Accordingly, prior aerating devices require the use of accessory agitation equipment in order to achieve reasonable aeration efficiency. Such accessory equipment is expensive and usually produces only localized agitation. A further common problem is loss of effluent via percolation from the bottom of the holding lagoons with consequent seepage into nearby streams, reservoirs, etc. Accordingly, additional means are often required to seal off the bottom of the holding lagoon.

OBJECTS AND SUMMARY OF INVENTION

A primary object of this invention is to provide novel apparatus for agitating and aerating sewage and industrial wastes in lagoons, tanks, pools, moats and the like.

A further primary object of this invention is to provide a novel method of agitating and aerating sewage, industrial wastes and the like.

A more specific object is to provide novel apparatus for aerating and agitating liquid wastes that is adapted to release aerating gas in a manner that provides fast and uniform dispersion throughout the liquid so as to improve bacterial action.

Another specific object is to provide waste treatment apparatus that combines the function of aeration and sludge agitation in a unique and novel manner.

Still another object is to provide a method and apparatus of the character described that also is adapted to prevent loss of effluent through seepage and percolation from bottom of a lagoon, pond, etc.

A further object is to provide apparatus of the character described that can be floated off of the bottom of the lagoon or holding tank so as to facilitate inspection and repair.

The foregoing objects are achieved by means of apparatus comprising a plurality of flexible, inflatable cells disposed at or near the bottom of the liquid holder and means for supplying and withdrawing air to and from the cells so as to cause them to periodically inflate and deflate, whereby the surrounding liquid is agitated by the varying water displacement of the cells. In the preferred embodiment of the invention the cells are inflated sequentially so as to produce a wave of agitation in the surrounding liquid. Aeration and deflation are accomplished by providing the cell with pores, holes, or orifices that permit gas to escape from the cells into the surrounding liquid at restricted rates so as to form small bubbles that rise in the liquid and make intimate contact with suspended solids. The cells may be compartments formed in a large bag that is anchored in the liquid holder and the bag may be adapted to serve as a liner for the bottom of the holder so as to prevent or minimize loss of liquid through percolation and seepage.

THE DRAWINGS AND DESCRIPTION OF SPECIFIC EMBODIMENTS OF THE INVENTION

Other features and objects of the invention disclosed in or rendered obvious by the following detailed description which is to be considered together with the accompanying drawings wherein:

FIG. 1 is a cross-section of a preferred embodiment of the invention;

FIG. 2 is a plan view of the apparatus of FIG. 1;

FIG. 4 is a plan view, partly in section, of a modification of the invention;

FIG. 5 is a cross-sectional view of another modification of the invention;

Figure 3A:
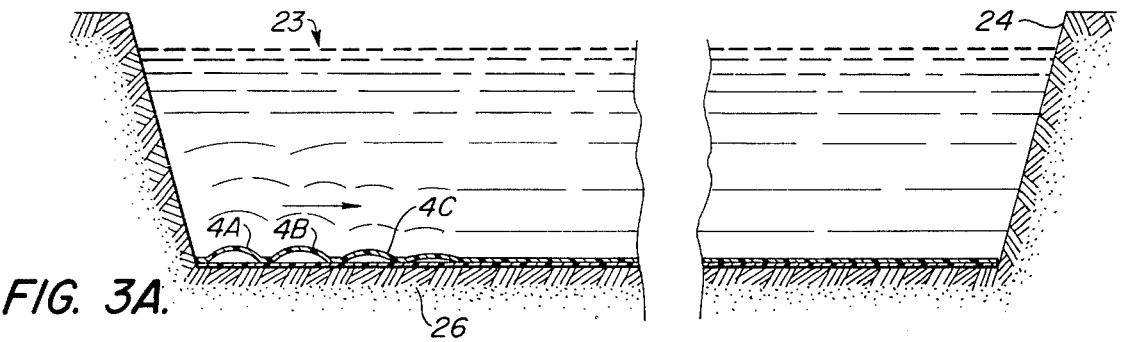
FIG. 3A and 3B are schematic views showing how a wave of agitation is produced in a liquid holder with the device of FIGS. 1 and 2.

Referring now to FIGS. 1 and 2, the illustrated apparatus is designed to produce three effects: (1) aeration of liquid effluent, (2) mechanical activation, i.e. agitation of sludge, and (3) sealing the bottom of the liquid holder to prevent or minimize loss of fluid through seepage and percolation. Essentially the invention, as shown in FIGS. 1 and 2, comprises a large bag 2 which is subdivided into a plurality of similar compartments or cells 4. The bag is made of sheets of a flexible water-impervious material, e.g., a plastic or a natural or synthetic elastomer or a fabric impregnated with a plastic or an elastomer. Essentially the bag comprises two sheets 8 and 10 which may be of any desired configuration, e.g., rectangular as shown. The sheets may each comprise a single layer or two or more laminated plies. The two sheets are sealed to each other along their entire outer edges 12 and are also sealed to each other at spaced apart regions 14. The two sheets may be secured to each other by welding, e.g. where the sheets are made of thermoplastic material, or by other suitable means such as a water resistant cement. The upper sheet 8 is made larger than the bottom sheet 10 so as to permit sections thereof to form flutes 16 between the sealed regions 14. The flutes 16 and underlying portions of sheet 10 form the cells 4. The bottom sheet 10 is free of holes or pores. However, the upper sheet 8 is provided with small pores or holes 18 which serve as escape orifices for gas introduced to the cells 4. In the illustrated embodiment the cells 4 are elongate parallel chambers and extend from one side edge to the opposite side edge of the bag.

Air is introduced to the cells of the bag via suitable inlet ports and fittings that may be located either in the upper sheet 8 or the lower sheet 10 and preferably at corresponding ends of the cells. In the embodiment of FIGS. 1 and 2, air is introduced to the cells via inlet fittings 20 that are secured in openings in the lower sheet 10 and are connected to individual inlet lines 22 that may be in the form of hoses or pipes. The bag is positioned on the bottom of the water holder which as shown is a lagoon 23 having sloping sides 24 made of concrete and a relatively flat earth or dirt bottom 26. In this case the fitting are buried in the bottom (see FIG. 1) and the lines 22 extend up out of the lagoon at one side to a gas distributor 28 that is mounted outside of the lagoon, preferably in a control room enclosure. The bag is anchored to and extends fully across the bottom of the lagoon so as to provide a seal or barrier that effectively prevents little or no loss of water through percolation down from the bottom of the lagoon. In this connection it is to be noted that the margins 12 of the bag may be made large enough so as to extend up along and be secured to all of the side walls of the lagoon, thereby reducing loss of fluid through the sides of the lagoon. This feature is advantageous where the sides of the lagoon are not lined with concrete or stone. Sealing of the sides of the lagoon may be accomplished by enlarging only one or both of the sheets 8 and 10. However, if the sheet 8 is used for this purpose, its enlarged margins must be free of pores 18.

The bag 2 may be held on the bottom of the lagoon by various means, e.g. by staking it, by weighting it down with weights positioned along its margins 12 or along the sealed regions 14 or by incorporating negative buoyancy means such as metal (or gravel) in sealed pockets formed in the bottom sheet (preferably if the latter comprises a laminate of several sheets of plastic material) or in pockets formed between the two sheets 8 and 10 at their margins and the sealed regions 14. Preferably the bag is held against the bottom by means of weights 30 placed on top of the margins 12 and optionally one or more of the sealed regions 14. The weights may be conventional concrete building blocks. Another suitable form of weighting means comprises a frame that conforms to the external configurations of the bag and is made of plastic pipe filled with sand or gravel.

Referring now to FIG. 2, the distributor 28 may take various forms. A preferred form comprises a rotary valve having a valve housing 32 provided with a plurality of outlets 34A–34N to which are coupled the lines 22 and a hollow valve member 36 rotatably disposed within housing 32 and having an air inlet connected via a line 28 to an air supply and a plurality of outlet ports (some of which are shown at 40) that are staggered so as to initiate and terminate discharge of air via successive ones of the outlets 34 at different times. The ports 40 are arranged so that air is discharged via outlet 34A first, then next through outlet 34B and so on with outlet 34N discharging air last. Rotation of valve member 36 may be intermittent by driving it with a stepping motor. Preferably, however, valve member 36 is operated continuously at a relatively slow rate by means of a motor 42 that is coupled to the valve member, e.g., by way of a gear train represented schematically at 44. If motor 42 is replaced by a stepping motor, each step may be such as to cause valve member 36 to advance in increments that will provide the desired valving action. The air supply for the valve may be a plenum chamber but preferably is a compressor 46 that may be driven by an electric motor or an internal combustion engine.

Figure 3B:
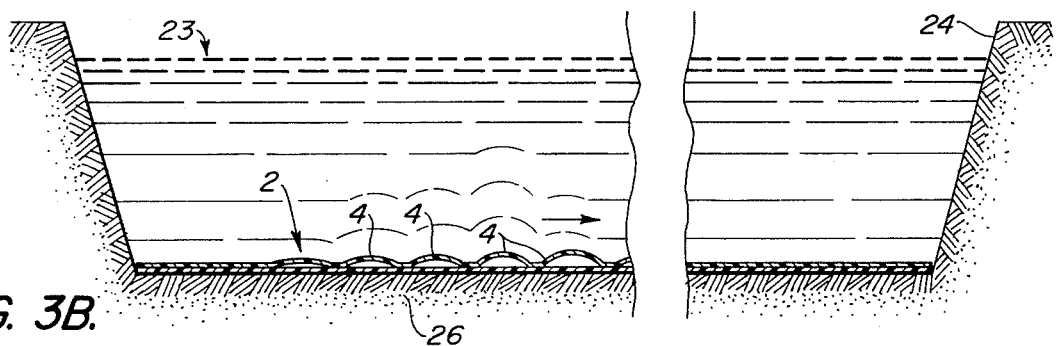

The preferred mode of operation of the apparatus of FIGS. 1 and 2 will now be described with further reference to FIGS. 3A and 3B. Assume that the bag 2 covers the entire bottom of a lagoon 23 and is disposed so that the cells 4 run from one side to the other of the lagoon as shown in FIGS. 3A and 3B. Assume also that the cells 4 are not pressurized with gas and thus are deflated under the weight of the water pressing down upon it. With the compressor operating to supply compressed air at a pressure in the order of 100 psi, motor 42 is started and allowed to operate continuously, whereby valve member 36 rotates relative to valve housing 32. Air under pressure is discharged via outlets 34A–34N in turn and delivered via the connected hose lines to the cells 4. Assume that at the outset valve member 36 is positioned so as to discharge air via outlet 34A to the first-in-line cell 4A. Almost immediately after cell 4A beings to receive compressed air, air begins to escape from the cell via the pores 18, but at a total rate less than the rate at which it is being delivered to the cell from the compressor, with the result that the cell undergoes inflation by the incoming air. The resultng increased displacement of the cell produces movement, and hence agitation, of the surrounding fluid. Then as valve member 36 continues to move, it causes air to be fed to the next-in-line cell 4B and terminates flow of air to cell 4A, whereupon cell 4B begins to inflate and cell 4A beings to deflate. As valve member 36 rotates further, flow of air to cell 4B is terminated and air now flows to cell 4C, whereby cell 4B begins to deflate and cell 4C inflates. As the valve member continues to rotate, the distribution of air is advanced in the manner described so that at the end of one revolution of the valve member air is flowing only to the last-in-line cell 4N. This cycle is repeated continuously, so that successive cells are inflated in turn and as soon as the flow of air to each cell is terminated, it begins to deflate due to continual bleeding of air via the pores 18. As a result, at any one time individual cells are in different stages in their cycle of inflation and deflation. More importantly, because of the fact that successive cells are inflated in sequence, a wave of agitation is produced across the lagoon from one side to the other, stirring up sludge and exposing it to air being discharged from the cells. The amount of agitation produced by inflation and deflation of each cell and the frequency of the wave of agitation can be varied by (1) modifying the cross-sectional size of the cells 4, (2) adjusting the level to which each cell is pressurized, and (3) adjusting the rate at which air is introduced to each cell and the rate at which the cells are deflated. The latter two adjustments can be made by changing the rate of rotation of the valve member 36, the size of the distributor valve and hose lines 22, the size of escape orifices 18, and the level to which the air is pressurized by compressor 46.

It also is contemplated that the distributor valve may be modified so that the time duration of the air input to one cell overlaps the time duration of the air input to the next-in-line cell, so that as one cell is in the later stage of its inflation period the next cell is in the early stage of its inflation period. This can be achieved in a variety of ways, e.g., by elongating the ports 40 circumferentially as shown in dotted lines in FIG. 2 whereby at any one time two of the ports are positioned to pass air to the outlets 34 connected to adjacent cells of the bag 2. Similarly it is possible to arrange the ports 40 so that at any one time three or more of the cells are being supplied with air, with successive cells being in different stages of their inflation periods. It is to be noted also that if the cells are of the same size and have the same number of gas escape orifices 18, the deflation periods of successive cells will overlap in the same way as their inflation periods.

FIG. 4 shows a modificaton of the above-described apparatus. In this case the bag 2A is essentially the same as the bag 2 except that the upper and lower sheets 8 and 10 are sealed together so that pairs of cells are interconnected to provide for serial flow of air. As shown, the two sheets are continuously sealed together along their four sides to form the margins 12, but the intermediate sealed regions do not all extend fully from one side to the other of the bag. Instead every other sealed region 14A stops short of a side margin 12 so as to form an internal passageway 15 between adjacent cells 4. The other sealed regions 14B extend fully from one side to the other of the bag. Additionally, only one cell of each serially connected pair of cells is coupled to an air inlet line 22. The lines 22 are connected to an air distributor (not shown) similar to the distributor 28 of FIG. 2. With this arrangement, the cells are inflated in pairs, with the first-in-line cell of each pair undergoing inflation earlier than the second-in-line cell of the passageway 15 is properly restricted in size and the two cells undergoing inflation substantially in phase with each other if the passageway 15 is made large enough to pass air as fast as it is introduced via the connected hose line 22. The two cells of each serially connected pair of cells will deflate substantially concurrently with each other if each cell has substantially the same number of escape orifices 18.

FIG. 5 shows a further modification of the multi-cell bag 2 which is preferred when it is not essential for the bag to act as a liner for the bottom of the lagoon. In this case, the upper and lower sheets 8A and 10A are secured to each other so that both of them form flutes 16A. Such an arrangement has the advantage of increasing the effective inflated size of the cells. Of course, when the cells are deflated, the flutes collapse and engage each other.

In the foregoing embodiments of the invention, the flexible sheets 8 and 10 may or may not be stretchable, e.g., be made of elastomers. It is preferred that the sheets that have the flutes, e.g. sheet 8 in FIG. 1 and sheets 8A and 10A in FIG. 5 be stretchable under the applied air pressure since this has the advantage of increasing the effective volume of the cells when inflated. Suitable stretchable sheet materials are those made of natural or synthetic elastomers, e.g., Buna-N or Buna-S rubbers or silicone rubber.

Figure 6:
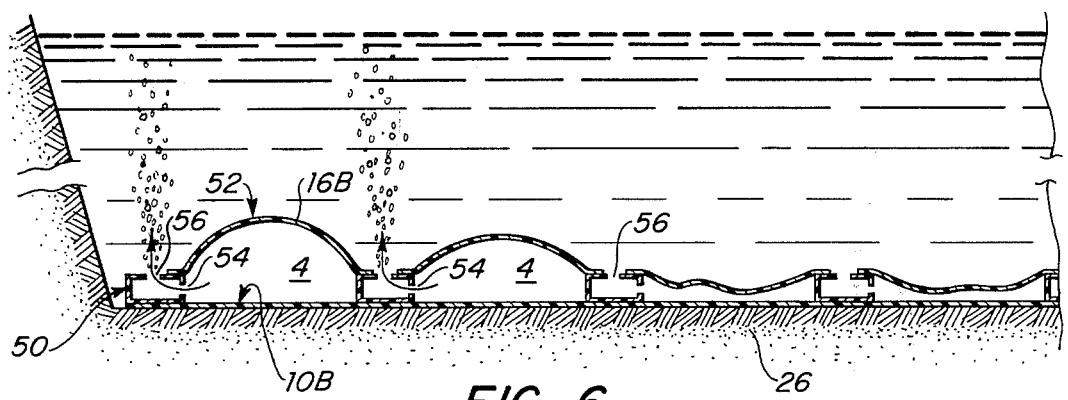
FIG. 6 is a cross-sectional view of still another modification of the invention.

The embodiment of FIG. 6 is similar to the embodiment of FIG. 1 in that the bottom sheet 10B is unflated and hence can lie flat against the bottom of the lagoon like the sheet 10. It differs from the embodiment of FIG. 2 in that rectangular hollow, closed-end blocks or tubes 50 are secured to the sheet 10B and serve as anchoring points for narrow sheets 52 of a water impervious flexible material. The latter are made wider than the spacing between tubes 50 so that when anchored to the tubes they form arches or flutes 16B under the influence of applied air pressure. The sheets 52, tubes 50 and sheet 10 cooperate to define a plurality of elongate parallel cells 4. The ends of sheets 52 extend beyond the ends of tubes 50 and are sealed to opposite margins of sheet 10B. Although not shown, it is to be understood that each cell 4 is fitted with inlet fittings as described above in connection with the embodiment of FIG. 1. Escape of air from the inflated cells is accomplished via a series of openings 54 in one side of tubes 50 and another series of openings 56 in the upper side of the tubes. It is to be noted that each cell leaks air through only one of the tubes 50 to which it is sealed and that the cells are inflated in sequence as described above in connection with the preferred embodiment of the invention. The sheets 52 need not, but preferably, are made of stretchable material. Of course, the tubes 50 need not be of rectangular cross-section and instead may take some other convenient form, e.g. they may be circular or square. These tubes may be made of a variety of materials, e.g. plastic, brass, rubber, and may or may not have sufficient density to hold the bag against the bottom of the lagoon even when one or more of the cells is inflated. Thus the tubes may be loaded with a coarse gravel through which the air can pass from the cells to the escape orifices 56. Other means for holding the bag down may also be used as described above in connection with the embodiment of FIGS. 1 and 2.

Figure 7:
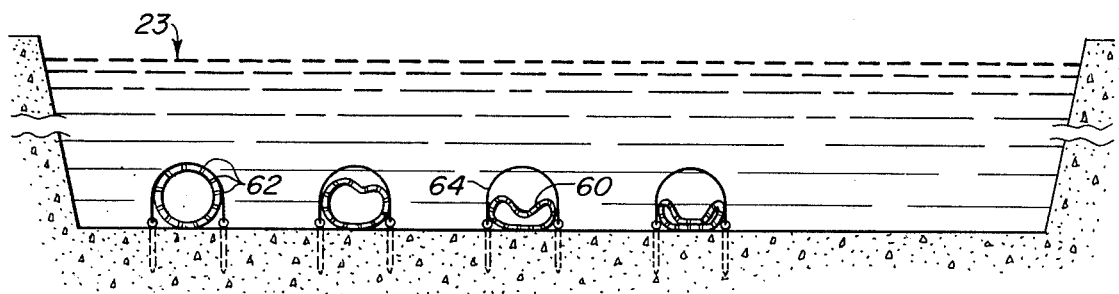
FIG. 7 is a cross-sectional view of a further modification of the invention.

FIG. 7 shows still another embodiment of the invention. In this case the cells take the form of individual closed end tubes 60 that are formed of a flexible material that may or may not also be stretchable. These tubes may be of any suitable cross-sectional configuration, e.g. round as shown. They are formed with a plurality of openings or pores 62 along their entire lengths and preferably also along their entire circumferences. The tubes are disposed parallel to each other with any convenient spacing between them. They may be anchored to the bottom of the lagoon or may be tethered to the bottom so as to be capable of limited vertical movement toward and away from the bottom. Various means may be employed to anchor or tether the tubes. Thus they may be formed with perforated ears at spaced points along their lengths, with the ears serving as anchors for chains or cables that are secured, by staking or other means, to the bottom of the lagoon. Another suitable way to anchor the tubes is to secure them in place by U-shaped metal anchoring elements 64 that are driven into the bottom of the lagoon. Although not shown, it is to be understood that one or both ends of each tube 60 has an inlet port provided with a fitting for connection to inlet air lines corresponding to lines 22. In operation, successive ones of the tubes 60 are inflated sequentially, like the cells 4 of FIG. 2, with each cell deflating through loss of air via holes 62 when inflow of pressurized air is terminated. This sequential inflation and deflation prodcues a wave of agitation that mechanically agitates sludge, while at the same time the sludge is contacted with small bubbles of air escaping from the deflating tubes.

Of course, it is possible to produce agitation without aeration. This is accomplished by constructing the devices above described without any bleed or gas escape orifices and by providing each cell or tube with an exit port that is connected to a hose line or pipe that leads out of the fluid holder. By suitably restricting the size of the exit ports, the cells or tubes may be caused to deflate at a controlled rate under the existing hydraulic pressure when inflow of pressurized air is terminated. Alternatively, the exit ports may be connected to another valving means similar to that described above which sequentially vents successive cells or tubes for a period long enough to cause the desired rate of deflation.

Still other modifications will be obvious to persons skilled in the art which are characterized by the advantages hereinabove described.

It is contemplated that the escape orifice 18 need not be simple holes or pores in the flexible sheet material and may in fact comprise mechanical valving means similar to a check valve that allows air to escape but prevents water from being sucked into the cells. The escape orifices 18 may also be so formed in the sheet material as to act in a manner similar to check valves. It also is to be understood that the orifices 18 may be micro-sized pores that will pass air or other gas by a diffusion process but will not pass a liquid.

Typical plastic sheet materials for constructing the cells above described are natural or synthetic elastomers such as silcone rubber, nitrile rubber and Buna-N or Buna-S rubbers, and also polyethylene, polypropylene, nylon, Corfam, polyvinyl chloride, polyurethane, and acrylo-butadiene-styrene. Also useable are glass fiber fabrics impregnated with a plastic or a natural or synthetic elastomer. Still other materials suitable for this purpose will be obvious to persons skilled in the art.

It is to be noted that the invention also may be practiced with gases other than air. Thus pure oxygen or ozone may be used. Also it is possible to use the invention to deliver a non-oxygen gas to the effluent. Thus the invention lends itself to dispensing chlorine or a chlorine-containing gas to the effluent. Where agitation is the sole object, it also is possible to inflate the cells with an inert gas such as nitrogen. If bactericide is desired, the gas may be a bacteria poison.

An important advantage of the invention is that the aerating and/or agitating devices constructed in accordance with the present invention are not irretrievably secured to the bottom of the liquid holder and may be floated to the surface for inspection and necessary repair. Accordingly, it is contemplated, for example, that the weights used to hold the aerating and/or agitating devices may be secured to chains or cables whereby they may be readily lifted off of the device to permit the latter to be floated to the surface.

We claim:

1. Apparatus for agitating and aerating a liquid waste suspension containing suspended organic matter, said apparatus comprising in combination:
    a holder adopted to contain said liquid suspension, said holder having lateral boundaries and a bottom.
    agitating and aerating means disposed along said bottom, said agitating and aerating means covering the bottom of said holder, said agitating and aerating means comprising a bag having upper and bottom sheets, each of said sheets being formed of water-impermeable material, said upper sheet being flexible, and somewhat larger in size than said bottom sheet, said sheets being sealed to each other along their entire outer edges and also at spaced apart regions so as to define a plurality of closed inflatable cells disposed in side by side relation, and a plurality of holes in said upper sheet for releasing gas from within said cells at restricted rates so as to form small bubbles that rise in said liquid suspension and make intimate contact with and oxidize said suspended organic matter;
    means disposed along the periphery of said bag for anchoring said bag to said bottom so that said bottom sheet overlies and engages and is prevented from moving with said respect to said bottom; and
    gas delivery means coupled to said cells for supplying gas to said cells so that sequentially and repetitively said cells are (a) inflated by inflow of gas from said gas delivery means and (b) deflated by outflow of gas via said holes, and a wave of agitation is produced in the suspension by the sequential and repetitive inflation and deflation of the cells.

2. The combination of claim 1 wherein said cells are elongated and extend horizontally along said bottom.

3. The combination of claim 1 wherein said aerating and agitating means seals the bottom of said holder at least in part against passage of said liquid.

4. The combination of claim 1 wherein said each cell has at least one inlet port for gas delivered by said gas delivery means, and further wherein said gas delivery means comprise a valve operative to feed gas under pressure to said cells sequentially.

5. The combination of claim 1 wherein each of said cells comprises a top wall formed of a flexible sheet material and capable of distending so as to enlarge the volume of said cells when gas is admitted to said cells.

6. The combination of claim 1 wherein said gas delivery means comprise passageways leading from the interior of said cells to exit ports located in the regions between adjacent cells.

7. The combination of claim 1 wherein said holder has a relatively flat dirt bottom, and said gas delivery means is buried at least in part in said dirt bottom.

* * * * *